United States Patent
Grigsby, Jr. et al.

(10) Patent No.: US 9,303,113 B2
(45) Date of Patent: Apr. 5, 2016

(54) RELEASE COMPOSITIONS FOR LIGNOCELLULOSIC COMPOSITES

(75) Inventors: Robert A. Grigsby, Jr., Spring, TX (US); Christopher J. Moriarty, The Woodlands, TX (US); Sachchida N. Singh, The Woodlands, TX (US); George A. Smith, Conroe, TX (US)

(73) Assignee: Huntsman International LLC, The Woodlands, TX (US)

( * ) Notice: Subject to any disclaimer, the term of this patent is extended or adjusted under 35 U.S.C. 154(b) by 672 days.

(21) Appl. No.: 13/378,705

(22) PCT Filed: Jun. 15, 2010

(86) PCT No.: PCT/US2010/038603
§ 371 (c)(1),
(2), (4) Date: Jan. 26, 2012

(87) PCT Pub. No.: WO2010/147936
PCT Pub. Date: Dec. 23, 2010

(65) Prior Publication Data
US 2012/0121810 A1 May 17, 2012

Related U.S. Application Data

(60) Provisional application No. 61/187,379, filed on Jun. 16, 2009.

(51) Int. Cl.
*B05D 5/00* (2006.01)
*B05D 3/12* (2006.01)
*C09D 191/00* (2006.01)
*C08G 18/76* (2006.01)
*C08G 18/32* (2006.01)
*C08H 8/00* (2010.01)
*C08L 97/02* (2006.01)

(52) U.S. Cl.
CPC ........ *C08G 18/7664* (2013.01); *C08G 18/3275* (2013.01); *C08H 8/00* (2013.01); *C08L 97/02* (2013.01)

(58) Field of Classification Search
CPC ..... C08L 97/02; C08L 75/04; C08G 18/3275; C08G 18/7664; C08H 8/00
USPC ........................................................ 427/355
See application file for complete search history.

(56) References Cited

U.S. PATENT DOCUMENTS

| | | |
|---|---|---|
| 5,486,316 A | 1/1996 | Bershas et al. |
| 6,406,786 B1 * | 6/2002 | Stofko .......................... 428/327 |
| 6,753,003 B1 | 6/2004 | Kober et al. |
| 2005/0075440 A1 * | 4/2005 | Laubender et al. ........... 524/460 |
| 2007/0197464 A1 | 8/2007 | Groenhof |
| 2008/0138371 A1 | 6/2008 | Amrhein et al. |

OTHER PUBLICATIONS

International Search Report and Written Opinion regarding corresponding application No. PCT/US2010/038603, dated Aug. 18, 2010.

* cited by examiner

*Primary Examiner* — Dah-Wei D Yuan
*Assistant Examiner* — Kristen A Dagenais
(74) *Attorney, Agent, or Firm* — Robert A. Diaz

(57) ABSTRACT

Lignocellulosic composites are made by pressing a mixture of a particulate lignocellulosic material with polymeric MDI, in the presence of a fatty amine ethoxylate anti-masking agent.

7 Claims, 1 Drawing Sheet

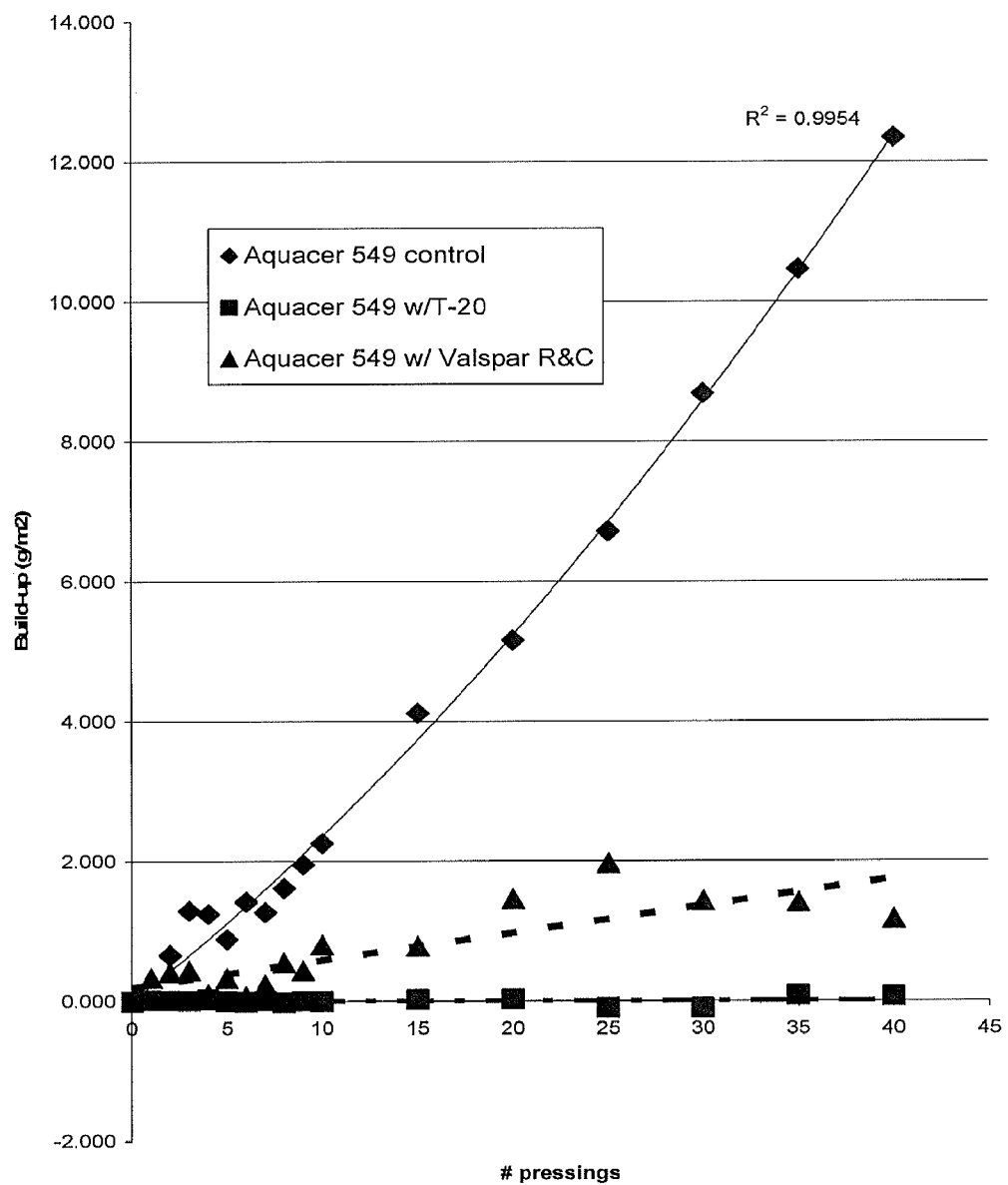

RELEASE COMPOSITIONS FOR LIGNOCELLULOSIC COMPOSITES

CROSS-REFERENCE TO RELATED APPLICATIONS

This application is the National Phase of International Application PCT/US2010/038603 filed Jun. 15, 2010 which designated the U.S. and which claims priority to U.S. App. Ser. No. 61/187,379 filed Jun. 16, 2009. The noted applications are incorporated herein by reference.

TECHNICAL FIELD

Embodiments of the present invention relate generally to polyisocyanate adhesives/binders and more particularly to the production of lignocellulosic composites using such binders.

BACKGROUND

Composite board products such as particleboard, medium density fiberboard (MDF), high density fiberboard (HDF), and oriented strand board (OSB) may be used in many applications such as home roofing and flooring, furniture, cabinets, door panels, frames, and signposts, as just a few examples. Generally, to make such composite products a particulate lignocellulosic (wood) substrate is mixed with a binder, and the mixture is put on a mat or other surface for pressing. A press, such as a static or a continuous press, may have one or more platens to exert and/or receive pressure. While in the press, the binder may be activated to bind the substrate particles together. Once cured, the composite product can be removed from the press.

Formaldehyde based binders have dominated the wood composite industry. But formaldehyde is linked to human health risks. For example, it is a common indoor pollutant, it may be toxic, it may cause allergic reactions, and it may be a human carcinogen. Thus, use of formaldehyde in composite wood products may be discouraged.

Isocyanate based binders, particularly polyphenylene polymethylene polyisocyanate (PMDI, or polymeric MDI) binders, offer advantages over formaldehyde based binders. These advantages include improved cure speed, superior board physical and moisture resistance properties, the ability to bond with lignocellulosic materials having high water contents, and the elimination of the formaldehyde emission hazard.

Using polymeric MDI binders in composite wood production does have, however, certain disadvantages. One disadvantage of PMDI binders is binder adhesion to the platen. Another disadvantage of PMDI binders is the accumulation of binder reaction products on the press platen or, when used, a die surface. Build-up on decorative die surfaces can be particularly troubling, as it will eventually accumulate to a point where it will "mask" the decorative surface on the composite product. The die then is un-usable and will have to be removed for cleaning. This cleaning process is costly and significantly reduces productivity.

To overcome these disadvantages, a layered methodology evolved to prevent binder build-up and sticking of pressed board to the press platen. Generally, three layers of binder-treated substrate are used in this method, one core layer, and two surface layers. Polymeric MDI is used to bind the core layer and a different binder, such as a formaldehyde-based binder, is used to bind the two surface layers. The three different layers of binder treated wood particles are laid out on the press prior to curing and care must be taken to prevent isocyanate-treated particles (core layer particles) from breaking through onto the surface layer and contacting the press surface.

Release agents have also been used to prevent PMDI bonded panels from sticking to platen/press surfaces and reducing surface build up (masking). External release agents can be applied to the press surface and/or to the surface of the binder-treated wood particulate mass before pressing takes place. Alternatively or additionally, an internal release agent may be mixed with the binder and/or the bulk particulate mass. Although helpful, release agent technology has not been reliable enough to permit the widespread industrial use of PMDI in surface layers of pressed composite boards.

Anti-bonding agents have also been employed to try to eliminate PMDI-induced adhesion and masking. Generally, a very thin layer of an anti-bonding agent, such as a silane- or silicon-based anti-bonding agent is coated and baked on to the press platen/die surface. In many cases, the anti-bonding agent has resulted in acceptable release, but platen/die masking is still a concern.

Unfortunately, use of release agents and anti-bonding agents have not resulted in widespread use of PMDI based binders in surface layers. Furthermore, there has still been a loss in productivity and thus cost-effectiveness due to the need to repeatedly stop production to clean press platens or/or dies.

Thus, there is still a need for ways to reduce PMDI adhesion and reaction-product build up on press platens and masking of die surfaces.

SUMMARY OF THE INVENTION

Embodiments described herein provide a process of applying an anti-masking agent between a lignocellulosic composite substrate and a pressing surface, the anti-masking agent comprising greater than about 50% by weight of the total anti-masking agent of a fatty amine alkoxylate having free hydroxyl groups; and applying pressure to the lignocellulosic composite substrate using the pressing surface.

Other embodiments provide an anti-masking composition for applying to a pressure surface of an apparatus for making composite lignocellulosic articles, the anti-masking composition having a liquid carrier and an anti-masking agent dispersed in the liquid carrier, the anti-masking agent having a fatty amine alkoxylate component with free hydroxyl groups.

BRIEF DESCRIPTION OF THE DRAWINGS

FIG. 1 is a graph showing the results of simulated die-masking according to an embodiment of the present invention.

DETAILED DESCRIPTION

According to an embodiment of the present invention, a process for producing adhesive-bonded shaped lignocellulosic composite articles may be repeated a plurality of times before one or more pressing surfaces need to be cleaned. Pressing surfaces do not need to be cleaned often because build-up of isocyanate-binder and/or such binder reaction products on the pressing surface or surfaces is reduced. This reduction is due to the presence of a particular type of anti-masking agent. As such, polymeric MDI binders may be used in both surface layers and core layers of the composite article.

Generally, to make an adhesive-bonded shaped lignocellulosic composite article according to an embodiment of the process of the invention a lignocellulosic substrate is combined with a polyfunctional isocyanate adhesive component. The adhesive-treated substrate may be formed into a desired shape for pressing such a rectangular board shape. Because the surface of polymeric MDI-treated substrate may contact the pressing surfaces such as a platen or die, an embodiment of an anti-masking agent may be applied to one or more pressing surfaces, the exposed surface of the adhesive-treated substrate, or both. The anti-masking agent disclosed herein includes certain alkoxylated fatty amines, in particular ethoxylated fatty amines such as tallow amine ethoxylate compounds. These anti-masking agents result in significant processing improvements and advantages over currently available release systems.

Once an embodiment of the anti-masking agent is applied, the pressing surfaces press the adhesive-treated substrate under conditions that are suitable for curing the adhesive and bonding the lignocellulosic particles of the substrate together. Thereafter, the finished article, such as a board, is removed from the press and the process may be repeated a number of times before it is necessary to stop production to clean the pressing surfaces.

The substrate for producing a composite article may be any lignocellulosic substrate suitable for the production of press-bonded shaped composite articles. For example, the lignocellulosic substrate may be one or more of wood, either from a single wood species or a combination of different wood species; agricultural products such as nut shells, straw (e.g. rice, wheat, and barley), flax, bagasse, hulls from cereal grains, and plant stalks; and recycled lignocellulosic products such as pre- or post-consumer particleboard, medium density fiberboard (MDF), high density fiberboard (HDF), oriented strand board (OSB), and shredded paper, although embodiments are not limited to these examples.

Regardless of substrate type, the substrate is usually provided as particles of suitable shape and size. Particle shape may be any shape including regular and irregular shapes. For example, particles may be, without limitation, fibers, disks, spheres, chips, flakes, strands, wafers, trim, shavings, sawdust, straw, stalks, and combinations thereof. In some embodiments the particulate substrate may be a complex mixture of particles of different shapes.

Furthermore, particles may be any suitable size, but they are typically much smaller in size than the final composite article. In some embodiments, the particles are from less than 5 micrometers in diameter (as measured on the longest axis of the particle) to 20 cm in diameter, although embodiments are not so limited. In practice, the particulate substrate may be a complex mixture of sizes as well as a complex mixture of shapes.

In a particular embodiment, the substrate includes wood chips that are longer on one axis than the other. These particles may sometimes be referred to as disks, strands, or fibers. The wood chips may be produced by running larger pieces of wood through a wood chipper. In some embodiments the wood chips are, on average, from 1 cm to 10 cm in length (long axis) and from 1 mm to 5 mm thick. Generally, wood chips are the predominant wood feedstock used to manufacture OSB.

In another particular embodiment, the substrate is lignocellulosic fiber, which is fibers and fiber bundles that have been reduced in size from other forms of lignocellulose. For example, a widely used fiber is refined lignocellulosic fiber, which is produced by softening larger wood particles, such as chips and shavings, with steam and pressure and then mechanically grinding the wood in a refiner to produce the desired fiber size. Embodiments are not limited to fibers being formed in this way—fibers and fiber bundles may be made by any known method of fiberization or pulping, such as without limitation chemical, mechanical, chemical-mechanical, and thermal-mechanical means. In an embodiment, individual fibers may be from 5 micrometers to 80 micrometers in diameter and from 0.5 mm to 8 mm in length. Furthermore, a fiber bundle may include at least 100 individual fibers, although embodiments are not so limited. A type of fibrous substrate is the predominant feedstock used in the manufacture of fiberboard.

In some embodiments of the substrate, the lignocellulosic material is the sole substrate used, and in a particular embodiment only one species of wood is used at a time. But embodiments of substrate are not limited to lignocellulosic materials alone—in some embodiments one or more lignocellulosic materials are combined with non-lignocellulosic materials. Suitable non-lignocellulosic materials include, without limitation, ground carpet wastes, rubber granules, ground particles of organic foam materials, inorganic particulates, and combinations thereof. Like lignocellulosic materials, the non-lignocellulosic materials may be processed to form chips, flakes, fibers, strands, wafers, trim, shavings, sawdust, straw, stalks, and any other useful shape. In embodiments where the substrate is combined lignocellulosic and non-lignocellulosic materials, it is preferred that the lignocellulosic substrate is the predominant substrate by weight, although embodiments are not so limited and the non-lignocellulosic material may be the predominant substrate by weight.

Sometimes the substrate is dried before it is used to make a composite material. For instance, if the moisture level of the substrate is too high, it may interfere with adhesive performance. In some embodiments, a suitable substrate moisture level may be between 20% and 2% by weight or between 14% and 5% of the lignocellulosic material. To achieve these moisture levels the lignocellulosic material may be dried by exposing it to high temperature air especially if the lignocellulosic particulate material is derived from "green" wood.

The adhesive or binder applied to the substrate may be any adhesive or binder that is suitable for bonding lignocellulosic materials to form composites. Polyfunctional isocyanate compositions that contain free isocyanate (—NCO) groups are preferred, but embodiments are not limited thereto. The term "polyfunctional" encompasses difunctional and higher functionality isocyanate compositions. The term "free", with respect to isocyanate or —NCO groups, denotes the chemical group "—N=C=O" and is distinct from isocyanate groups that are masked by blocking groups (e.g., "blocked" isocyanates). Blocked isocyanates are unnecessary, and in some instances, they are not desirable or are even expressly excluded.

With respect to functionality, embodiments of polyisocyanates may have a number-average isocyanate group functionality of 2.0 or greater. It is preferred that the number-average isocyanate group functionality range from 2.0 to 3.0, from 2.5 to 3.0, or from 2.6 to 2.9, although embodiments are not so limited. In particular embodiments, number-average isocyanate group functionalities are greater than 2.1, 2.2, 2.3, 2.4, 2.5, 2.6, 2.7, or 2.9. As used herein, the term "number averaged" for group functionalities, molecular weights, and equivalent weights are for polymeric compounds; absolutes are for pure compounds unless otherwise indicated.

With respect to free isocyanate groups, embodiments of polyisocyanates have total free isocyanate group (—NCO) concentrations exceeding 10% by weight of the total polyisocyanates, although embodiments are not limited thereto. In some embodiments of the polyisocyanate, the total free isocyanate group concentration exceeds 15% by weight, and in other embodiments the concentration is 20% by weight or greater or 25% by weight or greater. In a particular embodiment, the free isocyanate content is 31.5% by weight of the total polyisocyanates. In some embodiments the polyisocyanate composition may be a single molecular species containing a plurality of free isocyanate groups, and in other embodiments the polyisocyanate composition may be a mixture of different molecular species each individually containing a plurality of free isocyanate groups.

Embodiments of polyisocyanates in the polyisocyanate compositions may have a number average molecular weight of from 100 to 5000. In some embodiments, the polyisocyanates have a number average molecular weight of from 120 to 1800, and in other embodiments, the number average molecular weight is from 150 to 1000. In still other embodiments, the number average molecular weight of the polyisocyanates is from 170 to 700, or from 180 to 500, or even from 200 to 400.

Polymeric polyisocyanates useful in embodiments of the adhesive component include aromatic polyisocyanates such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; and mixtures thereof. Preferably, at least 80 mole percent, and more preferably greater than 95 mole percent, of the isocyanate groups of the polyisocyanate adhesive composition are bonded directly to aromatic rings.

Of the aromatic polymeric polyisocyanates, MDI diisocyanate isomers and/or MDI series polymeric polyisocyanates (e.g., polymethylene polyphenyl polyisocyanates, which are also known as PMDI or polymeric MDI) having number averaged functionalities of greater than 2 are especially preferred aromatic polyisocyanates of the adhesive component. Examples of suitable PMDI adhesives include RUBINATE® M polyisocyanate and RUBINATE® 1840 polyisocyanate, both of which are available from Huntsman, The Woodlands, Tex. RUBINATE® M polyisocyanate is a complex mixture of MDI diisocyanate isomers and higher functionality oligomers of the MDI series. This polyisocyanate product has a free —NCO content of about 31.5% by weight and a number averaged functionality of about 2.7. Other examples of suitable isocyanates include mixtures of MDI isomers alone or with tri and higher functionality polymethylene polyphenyl polyisocyanates, and the tri or higher functionality polymethylene polyphenyl polyisocyanates themselves.

In particular embodiments, the MDI series isocyanates (or mixtures thereof) have total free isocyanate group concentrations exceeding 10% by weight, still more preferably exceeding 15% by weight, even more preferably 20% by weight or greater, and most preferably 25% by weight or greater. These MDI series polyisocyanate adhesives typically are liquid at 25° C. and have number averaged isocyanate group functionalities of greater than 2.2, still more preferably greater than 2.3, even more preferably 2.5 to 3.0, and most preferably 2.6 to 2.9.

In some embodiments of the adhesive, polymeric MDI is modified to be water dispersible. U.S. Pat. Nos. 3,996,154 and 6,407,196 disclose methods to modify the polymeric MDI to make it water dispersible and are incorporated herein by reference. RUBINATE® 1780 polyisocyanate is an example of an emulsifiable polymeric MDI; it may be obtained from Huntsman, The Woodlands, Tex.

Other examples of suitable polyisocyanates for use as adhesives include isocyanate terminated prepolymers and quasiprepolymers as is known in the art. Furthermore, non-prepolymer derivatives of MDI series and di and/or polyisocyanates (such as the carbodiimide, uretonimine, and/or isocyanurate modified derivatives; all bearing residual free isocyanate groups) are all suitable isocyanate derivatives.

Particular embodiments of the adhesive may include an aromatic isocyanate and a minor amount of one or more aliphatic polyisocyanates. Suitable aliphatic polyisocyanates include isophorone diisocyanate, 1,6-hexamethylene diisocyanate, 1,4-cyclohexyl diisocyanate, saturated analogues of the above-mentioned aromatic polyisocyanates, and mixtures thereof. Furthermore, the adhesive may include an aromatic isocyanate component and another wood adhesive component such as mixtures of polyisocyanate and a minor amount by weight of one or more formaldehyde-based adhesives. In yet other embodiments, the isocyanate adhesive may contain one or more transition metal organometallic catalysts as described in application PCT/US08/64459, which is incorporated herein by reference.

Embodiments of the anti-masking agent include one or more fatty amine ethoxylates containing free hydroxyl (—OH) groups. In some embodiments the fatty amine ethoxylate component is greater than 50% by weight of the weight of the masking agent. In other embodiments, the fatty amine ethoxylate component is greater than 90% by weight and in a particular embodiment the fatty amine ethoxylate is the sole component of the anti-masking agent. In those embodiments of the anti-masking agent where the fatty amine ethoxylate component is less than 100% by weight of the masking agent, the remainder of the masking agent may be comprised of any other one or more known anti-masking agents.

In an embodiment, the one or more fatty amine ethoxylates are tertiary amines containing a plurality of ether linkages having the general formula:

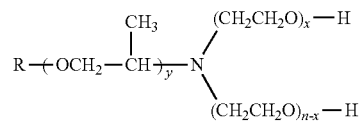

Wherein R is a linear or branched, saturated or unsaturated, aliphatic group having from 8 to 40 carbon atoms;
y is an integer of from 0 to 30;
n is an integer of from 2 to 50 and represents degree of alkoxylation; and
x is an integer of from 1 to 49.

In practice, however, the fatty amine ethoxylate may contain some residual secondary amine ethoxylate groups in addition to tertiary amine ethoxylate groups.

In some embodiments the R group has from 10 to 30 carbon atoms, in other embodiments the R group has 10 to 20 carbon atoms, and in still other embodiments the R group has from 12 to 20 carbons. In some embodiments, the R group is a naturally occurring material, such as tallow containing predominantly linear saturated or unsaturated $C_{14}$, $C_{16}$, or $C_{18}$ groups, or coco or soya groups.

In embodiments where y≠0, the above compound may be referred as fatty amine ether ethoxylated.

As is shown in the formula above, the fatty amine ethoxylate contains only ethylene oxide (EO), as the sole type of alkylene oxide unit in the molecule. In some embodiments, however, the one or both of the x and (n−x) EO groups may be replaced with one or more alkylene oxide groups such as propylene oxide (PO). Nonetheless, the relative amount of EO is preferably greater than 50 mole percent of all the alkylene oxide units in the molecule, and more preferably greater than 70 mole percent, and even more preferably greater than 90 mole percent.

To prepare the fatty amine ethoxylate, a base molecule is subject to ethoxylation. Ethoxylation generally require use of an alkaline metal hydroxide such as KOH, NaOH, and CsOH. Such alkaline metal hydroxides can be left as is or neutralized with weak acids, especially carboxylic acids, such as acetic or lactic acids, to form a salt. In some embodiments the base molecule subject to ethoxylation is a fatty primary amine having the structure $R-NH_2$. In other embodiments the base molecule may be one or more derivatives of a fatty amine such as fatty diamines having the structure $R-NH-(CH_2)_3-NH_2$; fatty triamines having the structure $R-NH-(CH_2)_3-NH-(CH_2)_3-NH_2$; and fatty tetramines having the structure $R-NH-(CH_2)_3-NH-(CH_2)_3-NH-(CH_2)_3-NH_2$, wherein the R groups are as discussed above.

Regardless of base molecule type, the number of EO units added to each individual N—H equivalent of the starting fatty amine ("ethoxylation ratio") is preferably from 2 to 50, more preferably 2 to 25, and still more preferably 3 to 20. In a tallow monoamine there are two N—H equivalents. In a tallow tetramine there are 5 N—H equivalents.

Examples of suitable fatty amine ethoxylates where y=0 and R=tallow are listed in Table 1, below. The general formula for such fatty amine ethoxylates is:

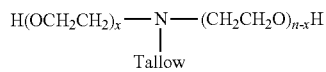

TABLE 1

Examples of Ethoxylated Tertiary Amines Available from Huntsman

| Trademark | Product | Theoretical Molecular Weight | Total Amine (meq/g) |
|---|---|---|---|
| SURFONIC ® | T-2 | 350 | 2.75-3.10 |
| | T-5 | 490 | 1.96-2.13 |
| | T-10 | 710 | 1.37-1.49 |
| | T-12 | 798 | 1.23-1.28 |
| | T-15 | 908 | 1.05-1.12 |
| | T-20 | 1150 | 0.89-0.94 |
| | T-50 | 2470 | .39-42 |

Additional examples of suitable fatty amine ethoxylates are listed Table 2, below. In these examples, y=0, but R is not necessarily tallow.

TABLE 2

| Trademark | Product | Chemical Description | Equivalent Weight (Minimum/Maximum) |
|---|---|---|---|
| "ETHOMEEN" Ethoxylated Amines | C/12 | Ethoxylated (2) Cocoalkylamine | 280/300 |
| | C/15 | Ethoxylated (5) Cocoalkylamine | 410/435 |
| | C/20 | Ethoxylated (10) Cocoalkylamine | 620/660 |
| | C/25 | Ethoxylated (15) Cocoalkylamine | 830/890 |

TABLE 2-continued

| Trademark | Product | Chemical Description | Equivalent Weight (Minimum/Maximum) |
|---|---|---|---|
| | O/12 | Ethoxylated (2) oleylamine | 343/363 |
| | O/15 | Ethoxylated (5) oleylamine | 470/495 |
| | T/12 | Ethoxylated (2) tallowalkylamine | 340/360 |
| | T/15 | Ethoxylated (5) tallowalkylamine | 470/495 |
| | T/25 | Ethoxylated (15) tallowalkylamine | 890/950 |
| | S/12 | Ethoxylated (2) soyaalkylamine | 342/362 |
| | S/15 | Ethoxylated (5) soyaalkylamine | 470/495 |
| | S/20 | Ethoxylated (1) soyaalkylamine | 685/725 |
| | S/25 | Ethoxylated (15) soyaalkylamine | 895/955 |
| | 18/12 | Ethoxylated (2) octadecylamine | 350/370 |
| | 18/15 | Ethoxylated (5) octadecylamine | 480/505 |
| | 18/20 | Ethoxylated (10) octadecylamine | 690/730 |
| | 18/25 | Ethoxylated (15) octadecylamine | 900/960 |
| | 18/60 | Ethoxylated (50) octadecylamine | 2370/2570 |
| "ETHODUOMEEN" Ethoxylated Diamines | T/13 | Ethoxylated (3) N-tallow-1,3-diaminopropane | 220/250 |
| | T/20 | Ethoxylated (10) N-tallow-1,3-diaminopropane | 375/405 |
| | T/25 | Ethoxylated (15) N-tallow-1,3-diaminopropane | 485/515 |
| "PROPROMEEN" Propoxylated A-mines | C/12 | N-cocoalkyl-1-1'-iminobis-2-propanol | 308/318 |
| | O/12 | N-oleyl-1,1'-iminobis-2-propanol | 371/391 |
| | T/12 | N-tallowalkyl-1,1'-iminobis-2-propanol | 373/383 |

Still more examples of suitable fatty amine ethoxylates are shown in Tables 3 and 4.

In these examples y≠0 and R is tallow in Table 3 and a variety (isodecyl, octadecyl) of groups in Table 4. These fatty amine ethoxylates may also be referred to as fatty amine ether ethoxylates or even ethoxylated ether amines.

TABLE 3

Examples of Ethoxylated Ether Amines Available from Huntsman

| Trademark | Product | Molecular Weight | Total Amine (meq/g) |
|---|---|---|---|
| SURFONIC ® | PEA-25 | 547 | 1.69-1.96 |

TABLE 4

Examples of Ethoxylated Ether Amines Available from Tomah

| Product | Chemical Description | Molecular Weight | Minimum Amine Value |
|---|---|---|---|
| E-14-2 | Bis-(2-hydroxyethyl) isodecyloxypropyl amine | 310 | 175 |
| E-14-5 | Poly (5) oxyethylene | 445 | 123 |

TABLE 4-continued

Examples of Ethoxylated Ether Amines Available from Tomah

| Product | Chemical Description | Molecular Weight | Minimum Amine Value |
|---------|---------------------|------------------|---------------------|
| E-17-2 | isodecyloxypropyl amine Bis-(2-hydroxyethyl) isotridecyloxypropyl amine | 345 | 155 |
| E-17-5 | Poly (5) oxyethylene isotridecyloxypropyl amine | 485 | 112 |
| E-19-2 | Bis-(2-hydroxyethyl) $C_{12}/C_{15}$ alkyloxypropyll amine | 350 | 150 |
| E-22-2 | Bis-(2-hydroxyethyl) Octadecyloxypropyl amine | 450 | 120 |

Of course, embodiments of the present invention may include additives, treatments, or both, but these components are optional and may be used as desired for a particular application. In fact, the need for, the purpose of, and the appropriate amounts of each of optional additives or treatments will be appreciated by those skilled in the art.

Examples of types of potential additives include sizing waxes, mold release agents, polyols, cure catalysts, isocyanate extenders (e.g., soy oils, linseed oil, lignin, carbohydrates, propylene carbonate), fire retardants (e.g., trichloropropyl phosphate, ammonium polyphosphate, triphenyl phosphate), smoke suppressants, water, wood preservatives, antifungal agents (e.g., zinc borate), antibacterial agents (e.g., boric acid), pigments, dyes, fragrances, antioxidants, ultraviolet absorbers, spumescent, reinforcing fibers such as glass or mineral or natural fibers, reinforcing mats, facing materials, ground plastics waste (a specific type of organic filler), and combinations thereof, although embodiments are not limited thereto. If used, the additive can be added together with the polyisocyanate adhesive or as a separate stream. Examples of potential treatments include applying an anti-bonding agent on pressing surfaces, pre-heating the lignocellulosic substrate, and the combination of both. Embodiments, however, are not limited to this list of potential treatments. Appropriate methods for using the additives or treatment, their use range, and the process used will generally be understood by those skilled in the art.

If sizing wax is used as an additional additive, it may be applied to the lignocellulosic substrate. Such waxes impart additional water repellency to the composite product while not adversely affecting the aesthetics, strength, or subsequent processing (such as laminating, priming, or gluing) of the composite product. Waxes used may include, but are not limited to slack wax, paraffin wax, polyethylene wax, polyoxythylene wax, microcrystalline wax, shellac wax, ozokerite wax, montan wax, emulsified wax, and combinations thereof.

In some embodiments an external release agent, internal release agent, or both are utilized as additives or treatments. External release agents are distinct from internal release agents in that they are applied onto the press surface and/or onto the exposed surface of the binder-treated substrate prior to pressing. In contrast, internal mold release agents are used in admixture with the lignocellulosic mass or in the bulk adhesive. Thus, the distinction between external and internal release agents is based on mode of use and not on chemical composition; although the chemical compositions of external and internal mold release agents are usually also different. There are a relatively large number of internal and external mold release compositions known in the art and any one or combination of them can be used here, if desired, as long as it does not interfere with embodiments of the anti-masking agent described herein.

In some embodiments one or more polyols may be utilized as an additive. For example the polyol or polyols may be mixed with the isocyanate adhesive, or with the bulk particulate mass, or both. Such polyols may improve cure rates and processability of PMDI binders. Examples of such polyols are described in detail in application PCT/US08/64459, which is incorporated herein by reference.

Furthermore, one of press surfaces may be treated with an anti-bonding agent to reduce sticking of the lignocellulosic composite to the press. Such anti-bonding agent may comprise compositions known in the art of pressing lignocellulosic composites as being effective in preventing sticking to the pressing surface. Examples of such anti-bonding agents include CRYSTALCOAT™ MP-313 and SILVUE® Coating (SDC Coatings, Anaheim, Calif.), ISOSTRIP® 23 release coating (Huntsman, The Woodlands, Tex.), aminoethylaminopropyltrimethoxysilane (Dow Corning Corporation, Midland, Mich.), and the like. In some embodiments, an anti-bonding agent may be baked onto the press platen/die surface. To do so, first the surface is cleaned free of dirt, dust, and grease; then from about 10 to 300 micrometers of a solution of the anti-bonding agent is sprayed onto the surface, and last the surface is baked at greater than 300° F. (149° C.) for about 1 to 4 hours.

The press utilized in an embodiment of the present invention may be any known press (e.g., used in the manufacture of composite lignocellulosic articles) or similar apparatus. For example, the press may be a static press, a batch-mode press, or a continuous press. Typically a press has one or more pressing surfaces. The pressing surface or surfaces may be any suitable surface, but in industry these surfaces are typically metal surfaces such as steel caul plates or dies. To increase the life of the pressing surface due to wear, abrasion, corrosion, etc., a coating and/or treatment such as chrome, nickel, nickel-cobalt, diamond-chrome, nickel-polytetrafluoroethylene, nickel-boron nitride, or titanium nitride may be applied to the pressing surface. The pressing surface or surfaces, whether coated, treated, or not, contact and compress the adhesive-treated substrate.

To treat the particulate substrate, a polyisocyanate adhesive component is added or applied to the substrate by any means known in the art. For example, in many applications the adhesive is sprayed onto the substrate such as by bulk spraying using spray nozzles or by spinning disks of the polyisocyanate. With spray application methods the adhesive may be evenly distributed throughout the mass of substrate particles. Other methods of applying liquid polyisocyanate adhesive to the lignocellulosic substrate include blowline blending and rotary blending. Mixing may be facilitated by using baffles and/or paddles in a blender.

Usually, the adhesive is applied or added in liquid fault, either in bulk or as a water emulsion, although embodiments are not so limited. The adhesive, generally, and in particular a polyisocyanate adhesive, may be applied to the substrate in the amount of from 0.5% to 10%, or from 1% to 8%, or even from 2% to 6% by weight relative to the weight of the untreated lignocellulosic substrate. That is, the adhesive may be added to the substrate as it is used in the composite manufacturing process—after any desired drying operations and before applying any adhesive or optional additive to the substrate.

The adhesive-treated substrate may then be formed into a shape that approximates that of the final composite article. For instance, the adhesive-treated substrate may be spread loosely onto a forming surface having a shape such as a rectangle. Such forming surfaces include mats, screens, caulk plates, die, and forming belts. In some embodiments these types of surfaces are pre-treated with an external mold release agent to facilitate release of the composite article after it has been made. In other embodiments, the adhesive-treated substrate is spread on a facing material, a board, or another type of surface that will become permanently bonded to final composite during pressing. In some embodiments, the lignocellulosic particulate substrate is pre-heated prior to or during shaping or formation. Heat sources for such pre-heating include microwave, radio frequency, infrared irradiation, hot air or steam, although embodiments are not so limited.

Notably, the polyisocyanate adhesive component may be used throughout the cross section of composite articles. That is, a different binder or adhesive is not required for surface layers. Thus, embodiments of the process are simplified and allow for layering of the substrate to obtain a desired orientation of lignocellulosic particles. Without the need for a different adhesive for the surface layers, the amount of adhesive-treated substrate that is spread on the forming surface may relate to the thickness and density of the final composite board, as those skilled in the art should appreciate. Furthermore, the amount of adhesive-treated substrate may also depend on the type of substrate used and on the pressing conditions, which should also be appreciated by a skilled artisan.

The anti-masking agent may be applied, in some embodiments, to the exposed surface of the adhesive-treated substrate and in other embodiments it may be applied to one or more pressing surfaces. In yet other embodiments, the anti-masking agent may be applied to both the exposed adhesive-treated substrate and the pressing surface or surfaces. The anti-masking agent may be applied to components other than the pressing surface or surfaces such as forming screens or other components that are not part of the press.

If the anti-masking agent is a liquid or low melting solid it may be applied as is. There is a preference, however, for dispersing the anti-masking agent in a liquid carrier as a solution or suspension. Generally, solutions are desired over suspensions. One example of a liquid carrier is water. But embodiments of liquid carriers are not limited to water—any suitable carrier may be used including certain liquid hydroxyl-containing compound of four carbons or less and mixtures thereof. Some examples of such hydroxyl-containing compounds include methyl alcohol, ethyl alcohol, propyl alcohol, ethylene glycol, propylene glycol, diethylene glycol, and glycerol to name just a few. In a particular embodiment the carrier may be a mixture of water and a minor amount of liquid hydroxyl-containing compound. Without being bound by theory, it is believed that in this embodiment, the liquid hydroxyl-containing compound increases the solubility of the active anti-masking ingredient in water. The concentration of anti-masking agent in the liquid carrier should be as high as possible while still allowing for suitable application properties, such as liquidity and low viscosity. In some embodiments, the concentration by weight of anti-masking agent in the liquid carrier will be between 2% and 40%, such as between 5% and 15%, for example about 10%. If a liquid carrier is used, the weight of such carrier is not considered part of the weight of the anti-masking agent because the carrier is not an active ingredient.

The anti-masking agent may be applied to a surface by any suitable method, such as by spraying. Regardless of application method, surfaces treated with the anti-masking agent are generally completely and evenly covered. For example, in some embodiments the active anti-masking agent (weight of carrier is not included) may be applied to each square foot of the particular surface from 0.01 grams to 2.0 grams but more preferably from 0.1 grams and 1 gram, although embodiments are not limited thereto. In some instances the anti-masking agent may be dried before additional processing.

To make the final composite article, the forming surface (with the adhesive-treated substrate thereon) is conveyed to the press. Generally, the pressing surface(s) applies adequate pressure to the substrate to obtain the desired composite thickness. In some embodiments heat and/or moisture are applied to the substrate while it is being pressed. Heat may be applied by any known means, but in many industrial applications it is provided by a hot pressing surface or surfaces. Heat may also be provided by steam injection or by a combination of steam injection and hot pressing surfaces. Likewise, moisture may be supplied by any known means including steam injection by the press or by spraying a mist of water onto the formed adhesive-treated lignocellulosic substrate as it enters the press. Embodiments, however, are not limited to these examples.

Without being bound by theory, curing of the polyisocyanate adhesive is believed to be predominantly by the heat-activated reaction of free isocyanate (—NCO) groups of the adhesive with moisture in the lignocellulosic particulate substrate. As a result, urea linkages are produced and possibly also biuret linkages, which increase the molecular weight and ultimately crosslink the adhesive. There may also be reactions which chemically bind the adhesive to the lignocellulosic material, such as reactions between free —NCO groups and hydroxylic and/or aminic functionality present in the wood.

Press conditions, including heat and moisture, may vary considerably depending upon the thickness of the composite, the type of particulate raw material used, the type and level of polyisocyanate adhesive used, density and surface quality requirements, and the presence and level of any additives. Ordinarily, press conditions are selected in order to promote the curing of the polyisocyanate adhesive and bonding of the lignocellulosic particles together such that the resultant composite has the desirable physical properties.

Typical pressures used in the pressing cycle are between 5 and 70 bars, but more typically from 10 to 50 bars. In one embodiment, the pressure used in the pressing cycle from 15 to 40 bars. Press residence times may be between 4-20 seconds/mm of product thickness, preferably from 5-16 seconds/mm, more preferably from 6-14 seconds/mm, and still more preferably from 7-12 seconds/mm of product thickness. Press temperatures (i.e. the pressing surface temperatures, such as platen temperatures) may be from 50° C. to 250° C., but more preferably from 70° C. to 230° C., still more preferably from 90° C. to 220° C., and even more preferably from 100° C. to 210° C. Although the aforementioned pressures, residence times, and temperatures are typical and/or preferred, embodiments are not limited thereto.

Another process consideration is press throughput, or the amount of composite articles produced by the press per unit time. Manufacturers strive for a balance between the need for high throughput and adequate cure. In order to achieve this balance the press cycle is often programmed so that the rate of pressure build, the temperature, and the duration of pressing are optimized for each type of product. The pressing cycle may be complex, and could have more than one pressure maximum.

After pressing is completed, the composite lignocellulosic article is released from the pressing surfaces. In embodiments where the article was made using a polyisocyanate-based adhesive throughout the cross-section of product, this release was unexpectedly and surprisingly easy. Thus, lignocellulosic composite articles may be produced using a polyisocyanate adhesive as the sole adhesive if a fatty amine ethoxylate anti-masking agent is used. This combination makes processing composite lignocellulosic substrates simpler and more economical because it facilitates the use of polymeric MDI binders in the surface layers of the composite as well as the core layer.

Furthermore, the fatty amine ethoxylate anti-masking agent are particularly effective at providing reduced buildup (or masking) on the pressing surfaces. Thus, the number of press loads (quantity of polyisocyanate treated substrate) before it is necessary to clean the pressing surfaces is increased. It is also believed that the ethoxylated fatty amine anti-masking agents according to the process of the invention may provide adequate memory and may not detract from the surface qualities of the composite product (such as paintability and color).

EXAMPLES

Example 1

Experimental Procedure: Simulated Die-Masking

Testing was completed to evaluate the "anti-masking" properties of ethoxylated fatty amine. To do so, wood composite panels were pressed on metal shim stock to simulate die masking. The wood composites were made from a substrate of southern yellow pine (*Pinus* sp.) flakes measuring about 100 mm×500 mm×1 mm in dimension. The substrate was treated with 6% by weight RUBINATE® M polymeric methylene diphenyl diisocyanate and 0.9% wood product accelerator 25010, both available from Huntsman. The adhesive-treated substrate was formed into 30×30 cm mats and topped with four thin nickel shim stock material measuring about 13×13 cm each. The formed wood composite mats were sprayed with 6.0 grams (at a concentration of 20 percent solids) of a paraffin release wax, AQUIFER® 539 products, from BYK USA Inc. Thereafter, two sets of mats were sprayed with 6.0 grams (at a concentration of 20 percent solids) of an anti-masking agent and one set of mats (the control set) was not sprayed with any anti-masking agent. The anti-masking agent sprayed on one set of mats was SURFONIC® T-20 fatty amine ethoxylate from Huntsman and the anti-masking agent sprayed on the other set of mats was Release'n Clean SF0520-40, a soap based release agent from Valspar Corporation.

A series of 40 panels were pressed to a density of 42 lb/cubic foot with the metal shim stock placed on the mat surface and configured in a 2 by 2 matrix (4 pieces total, two rows and two columns) in a heated press at 335° F. at about 400 psi compressing force. Following pressing, the shim stock were removed from the formed panel, and weighed with an analytical balance to 0.0001 grams.

Referring to FIG. 1, the anti-masking ability of the two anti-masking agents as compared to the control is shown. Generally, build up was calculated by subtracting the original weight of the shim stock from its weight after pressing and the build up per pressing number was recorded. As can be observed in the graph, the control series (diamonds) displayed die masking, which increased with each subsequent pressing. In contrast, the test series having the Release'n Clean soap product sprayed mats (triangles) displayed less die masking as compared to the control. But the other test series, with mats sprayed with SURFONIC® fatty amine ethoxylate (squares), did not display any die masking from the shim stock, indicating at least 40 successive substrates may be processed before cleaning the pressing surface.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A process for making a lignocellulosic composite article, comprising:
    combining a lignocellulosic substrate with a polyfunctional isocyanate adhesive component to make a lignocellulosic composite substrate;
    applying an anti-masking agent consisting of a compound having the chemical structure of Formula I and, optionally, a liquid carrier to the lignocellulosic composite substrate, a pressing surface, or both; and
    applying pressure to the lignocellulosic composite substrate using the pressing surface to form the lignocellulosic composite article; and wherein Formula I is:

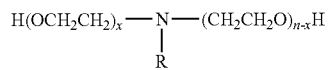

wherein R is a $C_8$ to $C_{40}$ linear or branched, saturated or unsaturated aliphatic group, n ranges from about 2 to about 50, and x ranges from about 1 to about 49; and
wherein the liquid carrier is selected from the group consisting of water, a liquid hydroxyl containing compound having 1 to 4 carbon atoms, and mixtures thereof.

2. The process of claim 1, the liquid carrier is selected from the group consisting of water, a liquid hydroxyl containing compound having 1 to 4 carbon atoms, and mixtures thereof.

3. The process of any of claim 1, wherein each of the alkoxylate groups of Formula I comprises at least 70 mole percent ethylene oxide.

4. The process of any of claim 1, wherein a ratio of moles of ethylene oxide to moles of nitrogen in Formula I ranges from about 2 to about 50.

5. The process of any of claim 1, wherein Formula I is a tallow amine ethoxylate.

6. The process of claim 1, wherein the anti-masking agent is applied to the lignocellulosic composite substrate.

7. The process of claim 1, wherein the lignocellulosic substrate comprises a plurality of lignocellulosic layers bonded together by a polyisocyanate adhesive composition having more than 10% by weight free isocyanate groups.

* * * * *